May 12, 1936.  J. R. GAMMETER  2,040,549
METHOD AND APPARATUS FOR MAKING SHEET RUBBER
Filed April 12, 1933
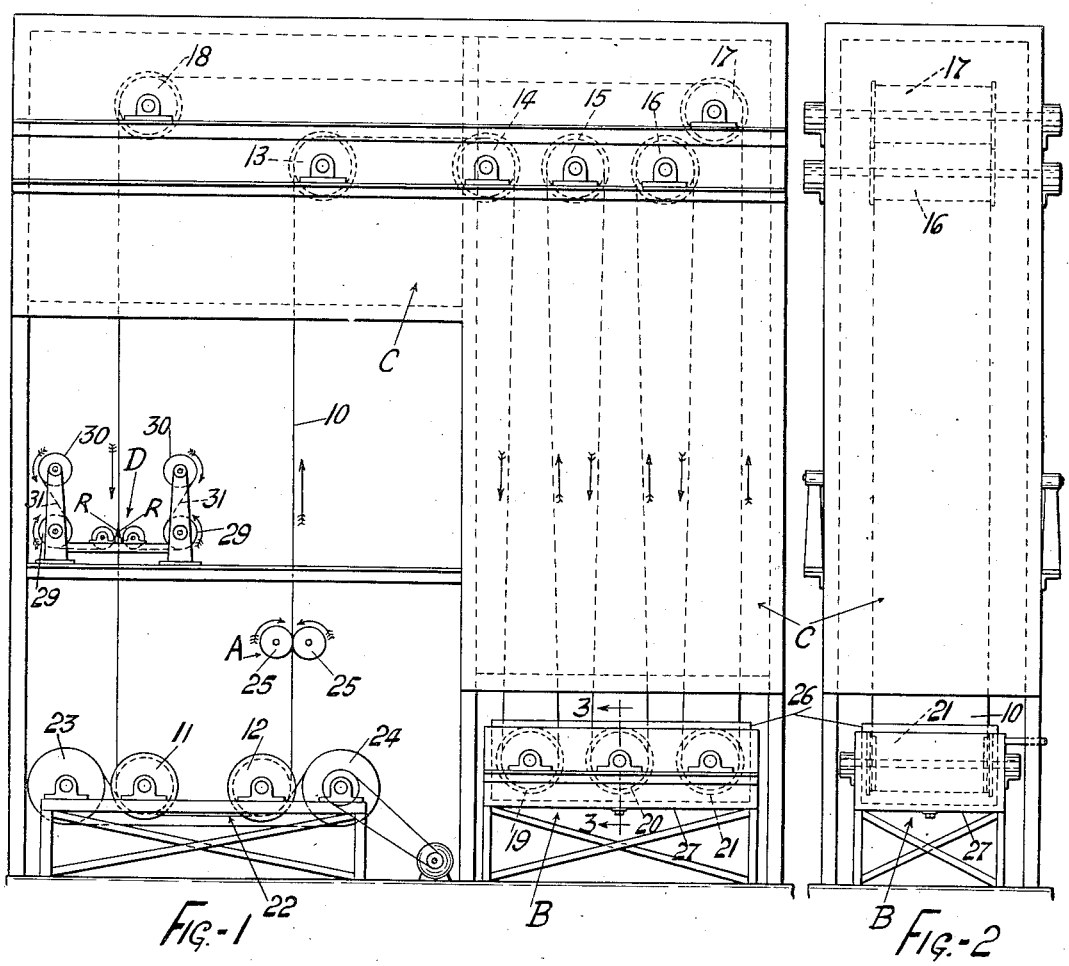
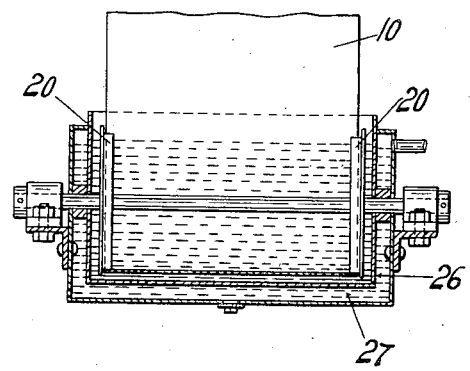
INVENTOR
JOHN R. GAMMETER
BY Ely & Barrow
ATTORNEYS Patented May 12, 1936

2,040,549

UNITED STATES PATENT OFFICE 2,040,549

METHOD AND APPARATUS FOR MAKING SHEET RUBBER

John R. Gammeter, Akron, Ohio, assignor to United States Rubber Company, New York, N. Y., a corporation of New Jersey Application April 12, 1933, Serial No. 665,761

13 Claims. (Cl. 18—15)

This invention relates to procedure and apparatus for making sheet rubber from dispersions or solutions of rubber such as liquid latex.

The general purpose of the invention is to provide simple, economical procedure and apparatus for making sheet rubber from water dispersions or solutions of rubber. Heretofore such sheet materials have been made by depositing a film thereof on a traveling surface such as the surface of a revolving drum. The object of the present invention is to provide a method and apparatus whereby a traveling web is caused to pass through a tank of the rubber liquid and the films thus deposited on the web are removed to provide sheet rubber in a more simple, economical manner.

The foregoing and other purposes of the invention are obtained in the device and by the method illustrated in the accompanying drawing and described below. It is to be understood that the invention is not limited to the specific form thereof shown and described.

Of the accompanying drawing,

Figure 1 is a side elevation more or less diagrammatic embodying and adapted to carry out the invention;

Figure 2 is an end elevattion thereof; and

Figure 3 is a section on line 3—3 of Figure 2.

Referring to the drawing, the numeral 10 designates an endless traveling web preferably of a smooth material such as aluminum from which deposited rubber may be removed with comparative ease. The belt 10 may be trained over peripherally-grooved, cloth-covered rolls 11, 12, 13, 14, 15, 16, 17 and 18 and under spaced, flanged wheels at 19, 20 and 21, (see Figure 3) whereby the belt may be guided along a path through a cleaning station A, a dipping station or stations B, a heating and drying chamber C and a take-off station D. The flanged wheels 19, 20, and 21 are so arranged as to engage the web solely at narrow marginal regions thereof whereby the major portion of the concave surface of the web is exposed while passing around said wheels. The web 10 may be driven by a hugger belt drive including a driving belt 22 trained over pulleys 23 and 24 and under rollers 11 and 12 in contact with web 10. Belt 22 may be power driven by driving pulley 24 as diagrammatically illustrated in Figure 1.

At station A there may be arranged a pair of revolving brushes 25, 25 rotated in the direction of the arrows shown associated therewith in Figure 1 by suitable means (not shown) and between which the web 10 passes to be thoroughly cleaned prior to passage to the dipping station B.

At station B there may be provided a single tank 26 for latex in which the flanged wheels 19, 20 and 21 are journaled for guiding the web on both sides through latex in the tank to coat the web with rubber. While the web is so directed in association with tank 26 as to be dipped three times into the latex in the tank, it will be understood that the invention contemplates any number, one or more, of dips. Tank 26 preferably is surrounded by a cooling jacket 27.

The chamber C provides a means for preheating the web 10 as it passes from station A to station B and also provides a means for drying the coatings of latex on the web between each dipping, the web 10 as illustrated in Figure 1 passing up into chamber C after each submersion in latex.

At station D take-off and reeling devices are shown arranged in association with web 10. Just in advance of passage to the station D, heated elements or hot irons may be applied to the side edges of the web 10 or other suitable means (not shown) employed to sever the films on the opposite faces of the web from each other. At the station D take-off rollers are associated with the opposite faces of the web under which the sheet rubber R may be trained and led to reels 29 rotated in the directions of the arrows shown associated therewith in Figure 1. Liner supply rolls 30 are provided whereby liner material 31 may be reeled with the sheet rubber to prevent adherence of the convolutions of rubber in the reel.

In accordance with the preferred mode of carrying out the invention, the heated web is caused to travel at a comparatively slow rate of speed, e. g. eight to twelve feet per minute through a latex preferably of the consistency of natural latex although a concentrated or a diluted latex may be employed. The speed of the web and its temperature, e. g. 150° F., are so adjusted that the latex collects on the web without any appreciable flow on the web after it passes out of the tank, the excess being pulled from the surfaces of the web by the capillary action at the surface of the latex. The cooling of the tank prevents accumulation of heat in the latex preventing coagulation in the tank either by heat or by evaporation of the preservative (ammonia) contained in the latex.

It will be apparent from the foregoing that rubber sheets of any desired thickness may be continuously made in a simple, effective and economical manner by the use of the invention, two strips of said strip material of any desired width depending upon the width of web used, being simultaneously produced. Rubber latex is the preferred raw material because of the ease of control of the deposit of this material on the web in the manner set forth in the preceding paragraph.

Modifications of the invention may be resorted to without departing from the spirit thereof or the scope of the appended claims.

What is claimed is:—

1. That method for making sheet rubber which comprises continuously passing a web through a body of rubber in liquid form one or more times, drying the rubber deposited on the web after each submersion of the web, severing the rubber film at the edges of the web, and continuously removing and reeling the sheets of rubber on the opposite faces of the web.

2. That method for making sheet rubber which comprises continuously passing a preheated web one or more times through a body of rubber in liquid form to coat both faces of the web with rubber, drying the rubber on the web after each submersion of the web, severing the rubber film at the edges of the web, and continuously removing the sheets of rubber from the opposite faces of the web.

3. That method for making sheet rubber which comprises continuously passing a web one or more times through a body of rubber in liquid form to coat both faces of the web with rubber, drying the rubber on the web after each submersion of the web, severing the rubber film at the edges of the web, and continuously removing the sheets of rubber from the opposite faces of the web.

4. That method for making sheet rubber which comprises continuously passing a web one or more times through a body of rubber in liquid form to coat both faces of the web with rubber, severing the rubber film at the edges of the web, and continuously removing the sheets of rubber from the opposite faces of the web.

5. Apparatus for making sheet rubber comprising an endless web, means for guiding said web through a cleaning station, cleaning means at said station comprising revolving brushing elements contacting said web, means for guiding said web one or more times through a dipping station, a tank for rubber in liquid form at said dipping station, means for cooling said tank a heated chamber, means for guiding said web through said heating chamber to said dipping station, means for guiding said web from said dipping station after each dipping operation through said heated chamber, means for guiding said web through a take-off station, and means comprising take-off rolls and associated reeling devices arranged on opposite sides of the web at the take-off station continuously to remove and reel the sheets of rubber from the opposite faces of the web.

6. Apparatus for making sheet rubber comprising an endless web, means for guiding said web one or more times through a dipping station, a tank for rubber in liquid form at said dipping station, means for cooling said tank, a heated chamber, means for guiding said web through said heating chamber to said dipping station, means for guiding said web from said dipping station after each dipping operation through said heated chamber, means for guiding said web through a take-off station, and means comprising take-off rolls and associated reeling devices arranged on opposite sides of the web at the take-off station continuously to remove and reel the sheets of rubber from the opposite faces of the web.

7. Apparatus for making sheet rubber comprising an endless web, means for guiding said web through a cleaning station, cleaning means at said station comprising revolving brushing elements contacting said web, means for guiding said web one or more times through a dipping station, a tank for rubber in liquid form at said dipping station, a heated chamber, means for guiding said web through said heating chamber to said dipping station, means for guiding said web from said dipping station after each dipping operation through said heated chamber, means for guiding said web through a take-off station, and means comprising take-off rolls and associated reeling devices arranged on opposite sides of the web at the take-off station continuously to remove and reel the sheets of rubber from the opposite faces of the web.

8. Apparatus for making sheet rubber comprising an endless web, means for guiding said web through a cleaning station, cleaning means at said station comprising revolving brushing elements contacting said web, means for guiding said web one or more times through a dipping station, a tank for rubber in liquid form at said dipping station, means for cooling said tank, a heated chamber, means for guiding said web from said dipping station after each dipping operation through said heated chamber, means for guiding said web through a take-off station, and means comprising take-off rolls and associated reeling devices arranged on opposite sides of the web at the take-off station continuously to remove and reel the sheets of rubber from the opposite faces of the web.

9. Apparatus for making sheet rubber comprising an endless web, means for guiding said web through a cleaning station, cleaning means at said station comprising revolving brushing elements contacting said web, means for guiding said web one or more times through a dipping station, a tank for rubber in liquid form at said dipping station, means for cooling said tank, a heated chamber, means for guiding said web through said heated chamber to said dipping station, means for guiding said web from said dipping station after each dipping operation through said heated chamber, means for guiding said web through a take-off station, and means comprising take-off rolls arranged on opposite sides of the web at the take-off station continuously to remove the sheets of rubber from the opposite faces of the web.

10. That method for making sheet rubber from liquid latex which comprises passing a preheated web through a body of said latex in a manner that exposes both surfaces of the web to the latex, and at a rate such that there will be no appreciable flow of latex on the web after it passes out of the latex body, drying the rubber thus deposited on the web and removing said rubber from the surfaces of the web.

11. That method for making sheet rubber from liquid latex which comprises passing a preheated web through a body of said latex in a manner that exposes opposite faces of the web to the latex, and at a rate such that there will be no appreciable flow of latex on the web after it passes out of the latex body, said latex body being cooled to prevent accumulation of heat therein from said web, drying the rubber thus deposited on the web, and removing said rubber from the surfaces of the web.

12. In apparatus for making sheet material the combination of a web, a body of viscous material, means within said viscous material for engaging the marginal portions of said web and guiding it through said material whereby both faces of the web are coated with the material, and means for removing said coating in sheet form from the web.

13. In apparatus for making sheet material the combination of a web, a body of fluent material comprising an intimate mixture of liquid and solids, and a pair of wheels at least partly immersed in said fluent material and adapted to guide said web through said material by engagement solely with its marginal portions whereby both faces of the web are exposed to and coated with said material.

JOHN R. GAMMETER.